United States Patent
Fujiwara (10) Patent No.: US 7,168,539 B2
(45) Date of Patent: *Jan. 30, 2007

(54) PULLEY UNIT HAVING ONE-WAY CLUTCH

(75) Inventor: Hideki Fujiwara, Kitakatsuragi-gun (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/977,522

(22) Filed: Oct. 28, 2004

(65) Prior Publication Data

US 2005/0092573 A1    May 5, 2005

Related U.S. Application Data

(63) Continuation of application No. 10/147,165, filed on May 16, 2002, now Pat. No. 6,830,137.

(30) Foreign Application Priority Data

May 24, 2001 (JP) .......................... P2001-155023
Jun. 21, 2001 (JP) .......................... P2001-187842

(51) Int. Cl.
*F16H 55/36* (2006.01)
*F16D 41/067* (2006.01)

(52) U.S. Cl. ..................... 192/45; 192/110 B (58) Field of Classification Search ................ 192/45, 192/110 B; 384/450, 516
See application file for complete search history.

(56) References Cited

U.S. PATENT DOCUMENTS

| 3,579,780 | A * | 5/1971 | Matt et al. ............. 29/898.063 |
| 5,728,020 | A * | 3/1998 | Muranaka et al. .......... 474/199 |
| 6,170,625 | B1 * | 1/2001 | Tanaka ........................ 192/45 |
| 6,554,480 | B2 * | 4/2003 | Ishiguro et al. ............. 384/516 |
| 6,830,137 | B2 * | 12/2004 | Fujiwara ...................... 192/45 |
| 6,923,576 | B2 * | 8/2005 | Tanaka et al. ............. 384/516 |
| 2001/0000285 | A1 * | 4/2001 | Tanaka ........................ 192/45 |
| 2002/0134974 | A1 * | 9/2002 | Fujiwara et al. ............ 254/391 |

FOREIGN PATENT DOCUMENTS

| JP | 11082690 A | * | 3/1999 |
| JP | 2000320651 A | * | 11/2000 |

* cited by examiner

*Primary Examiner*—Richard M. Lorence
(74) *Attorney, Agent, or Firm*—Jordan and Hamburg LLP (57) ABSTRACT

A pulley unit comprises a pulley, a shaft relatively rotatable with the pulley and concentrically arranged inner side of the pulley, a one-way clutch interposed in an annular space between the pulley and the shaft, and a ball bearing arranged adjacent to the one-way clutch in an axial direction in the annular space. The ball bearing has an inner ring and an outer ring. Raceway curvatures of the inner and outer rings of the ball bearing are set to not less than 50.5% and not more than 52.0%.

2 Claims, 10 Drawing Sheets

F I G. 13

PULLEY UNIT HAVING ONE-WAY CLUTCH

REFERENCE TO RELATED APPLICATION

This is a continuation application and incorporates the entire disclosure of Ser. No. 10/147,165 filed May 16, 2002, now issued as U.S. Pat. No. 6,830,137.

FIELD OF THE INVENTION

The present invention relates to a pulley unit having a one-way clutch. The pulley unit can be mounted in an auxiliary machine which is driven by a crankshaft of an engine of an automobile or the like through a belt. Examples of auxiliary machine are an air-conditioner compressor, a water pump, an alternator, a cooling fan and the like of an automobile.

BACKGROUND OF THE INVENTION

Various auxiliary machines mounted in automobile engines are driven by an engine crankshaft through a belt. Amongst the auxiliary machines, an alternator is driven by an engine crankshaft so as to generate electricity. When the alternator is coupled with the engine crankshaft so as to simultaneously rotate, as the number of rotation of the crankshaft decreases, the power generating efficiency decreases. In order to prevent the decrease of the power generating efficiency, an alternator having a one-way clutch in a pulley portion thereof has been devised. As to the alternator, when the rotational speed of the crankshaft lowers, the rotation of a rotor of the alternator is continued by inertial force so as to improve the power generating efficiency thereof.

Figure 10:
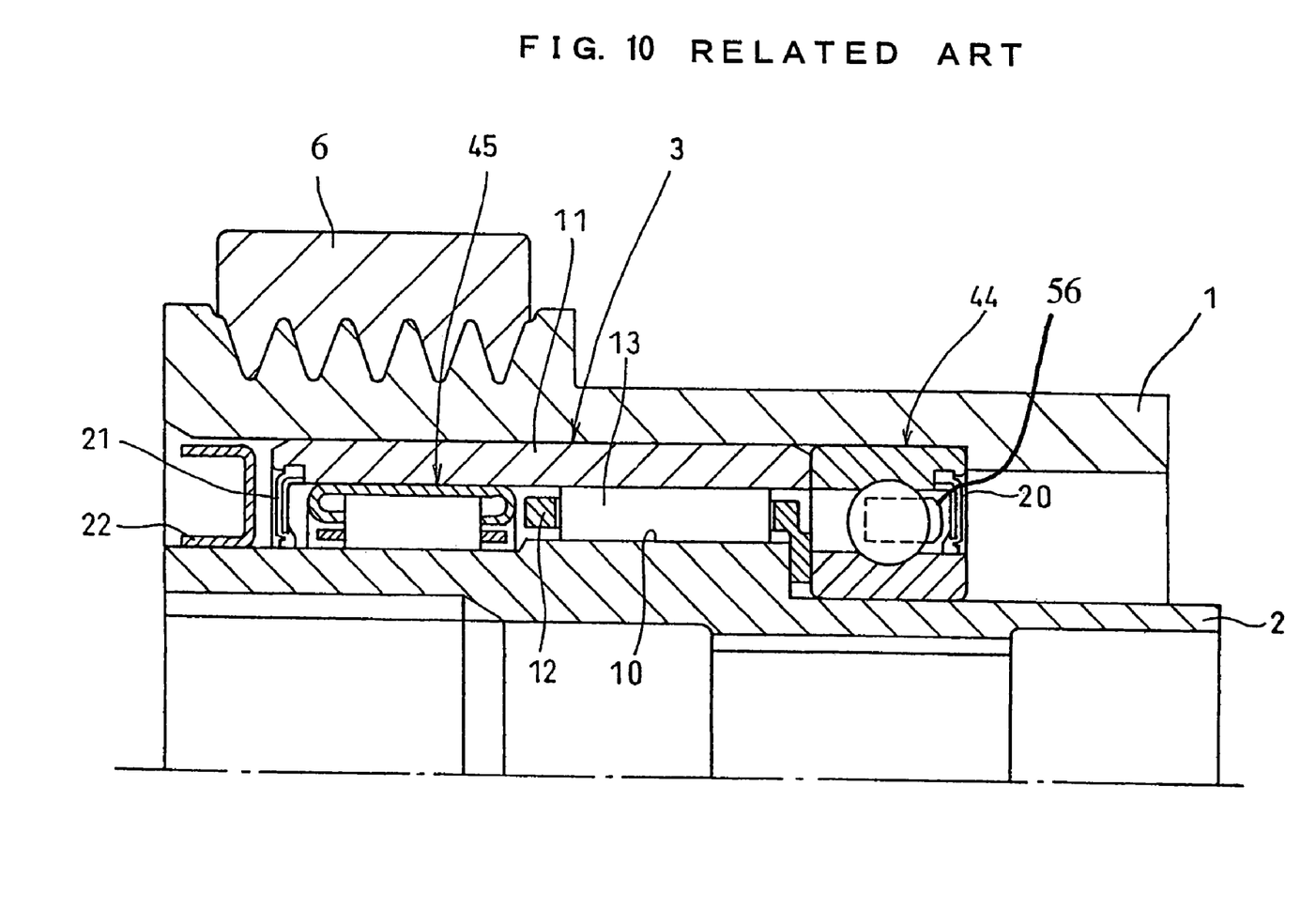
FIG. 10 is a sectional view of a related art pulley unit.

FIG. 10 shows a pulley unit. The pulley unit is equipped with a pulley 1, a rotor shaft 2, a one-way clutch 3 and a deep groove ball bearing 44 and a needle roller bearing 45. A cam face 10 is formed intermediate the axial direction of an outer peripheral surface of a rotor shaft 2. A belt 6 is wound around an outer periphery of the pulley 1. When the belt 6 is driven by an engine crankshaft of an automobile not shown in a figure, the pulley 1 is rotationally driven. The rotor shaft 2 is fixed to a rotor of an alternator. The one-way clutch 3 has a cage 12 and a plurality of rollers 13 which are housed in a plurality of pockets of the cage 12 one each. The rollers 13 are always pushed to a narrow side (lock side) of a wedge-like space by a coil spring not shown in a figure. The wedge-like space is an annular space in a circumferential direction formed between an inner peripheral surface of an outer ring 11 and the cam face 10 of the rotor shaft 2 so as to roll the rollers 13. The wedge-like space is narrowed to the lock side. The one-way clutch 3, the deep groove ball bearing 44 and the needle roller bearing 45 are sealed by a pair of seal rings 20, 21 and a seal annular body 22 and lubricated by a common lubricant.

In operation, when a rotational speed of the pulley 1 becomes relatively faster than the same of the rotor shaft 2, the rollers 13 of the one-way clutch 3 are rolled to the narrow side of the wedge-like space and so as to be in a locked state. The locked state is a state in which the outer ring 11 and the rotor shaft 2 can be integrally rotated via the rollers 13. The outer ring 11 and the pulley 1 are integrally arranged. As a result, the pulley 1 and the rotor shaft 2 are integrally rotated in the locked state so that a rotational power can be transmitted from the pulley 1 to the rotor shaft 2.

When the rotational speed of the pulley 1 becomes relatively slower than the same of the rotor 2, the rollers 13 of the one-way clutch 3 are rolled to a broad side (free side) which is the opposite side from the narrow side of the wedge-like space. As a result, the pulley unit becomes in a free state. The free state is a state in which the outer ring 11 and the rotor shaft 2 can freely rotate to each other. Thus, transmission of a rotational power from the pulley 1 to the rotor shaft 2 is intercepted. In the case where the rotor shaft 2 is being rotated prior to the interception, the rotor shaft 2 continues its rotation only by its own rotational inertial force after the interception.

Figure 11:
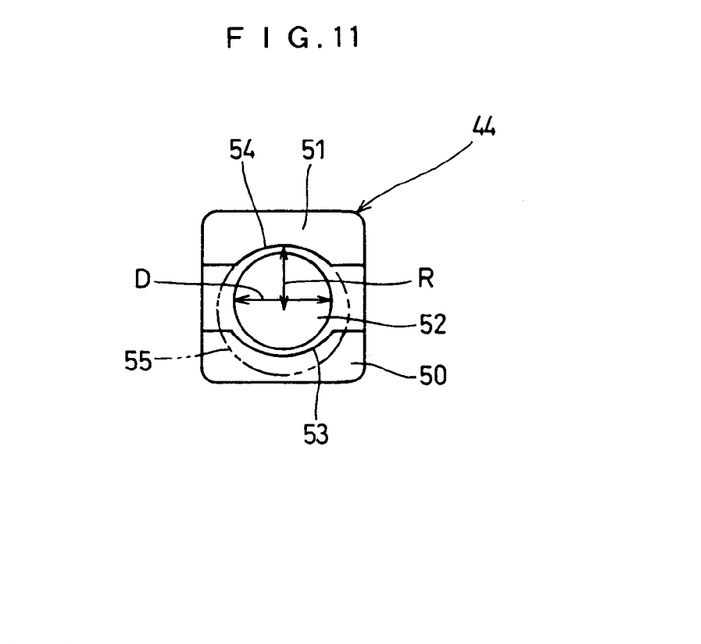
FIG. 11 is a sectional view of a deep groove ball bearing.

Referring to FIGS. 10 and 11, the deep groove ball bearing 44 will be described. The bearing 44 takes an axial load. The bearing 44 is equipped with an inner ring 50, an outer ring 51, a cage 56 and a plurality of balls 52. The inner ring 50 and the outer ring 51 respectively have raceway grooves 53 and 54. The race grooves 53 and 54 correspond to an arc of a circle 55 indicated by an imaginary line larger than a diameter of the balls 52. In a case that a curvature radius of the raceway grooves 53 and 54 is R and a diameter of the balls 52 is D, a raceway curvature (%) of the raceway grooves 53 and 54 is expressed as the formula (1).

$$\text{Raceway curvature} = (R/D) \times 100 \tag{1}$$

According to the formula (1), when the raceway curvature is 50%, the radius of the balls 52 (D/2) and the curvature radius (R) of the raceway grooves 53 and 54 are identical. Therefore, when the raceway curvature is 50%, the balls 52 are fitted to the raceway groves 53 and 54 with no gap. In this manner, when the raceway curvature is 50%, an axial deviation of the bearing 11 becomes completely nil. In this state, the balls 52 are fitted to the raceway groves 53 and 54 with no gap. Therefore, there are possibilities of a generation of a seizure on the raceway grooves 53 and 54 and of an undesirable influence on a service life of a lubricant due to a contact friction between the balls 52 and the raceway grooves 53 and 54. In order to deal with this, the above mentioned raceway curvature is set to a range of 52.0–52.5% for the raceway groove 53 of the inner ring 50, and to a range of 53.0–53.5% for the raceway groove 54 of the outer ring 51.

Figure 12:
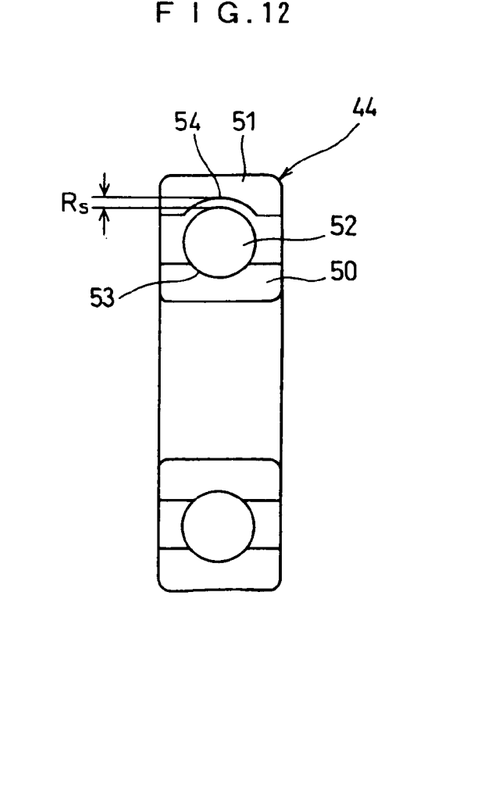
FIG. 12 is an explanatory drawing of a radial internal clearance after mounting.

As shown in FIG. 12, the bearing 44 needs to be mounted by force-fitting between the pulley 1 and the rotor shaft 2. For the reason thereof, a radial internal clearance of the bearing 44 is set to a few times as large as a standard radial internal clearance with regard to a tolerance. For example, in case of the bearing 44 having bearing designation 6807 in JIS (Japan Industrial Standard), a radial internal clearance before mounting thereof is set to 50–100 μm. When the bearing 44 is force-fitted between the pulley 1 and the rotor shaft 2, the radial internal clearance decreases. Therefore, the radial internal clearance after mounting of the ball bearing 44 is set to a range of approximately 21–52 μm.

In the case where the deep groove ball bearing 44,in which the raceway curvature of the raceway groove 53 is a range of 52.0–52.5%, the raceway curvature of the raceway groove 54 is a range of 53.0–53.5%, and the radial internal clearance before mounting thereof is a range of 75–99 μm, is mounted by force-fitting between the pulley 1 and the rotor shaft 2, the radial internal clearance after mounting thereof is a range of 21–52 μm and the axial internal clearance thereof is a range of 140–239 μm, as shown in Table 7.

TABLE 7

| radial internal clearance after mounting [μm] | axial internal clearance [μm] |
|---|---|
| 21~52 | 140~239 |

Figure 13:
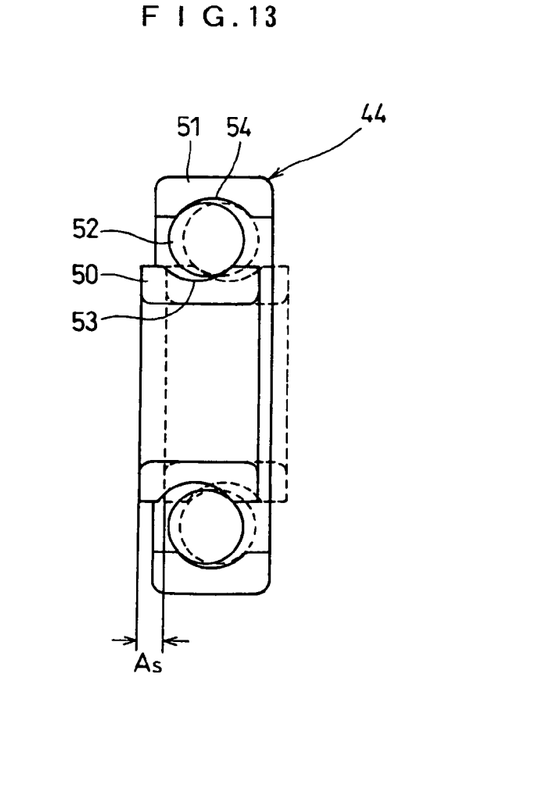
FIG. 13 is an explanatory drawing of an axial internal clearance.

The axial internal clearance, as shown in FIG. 13, denotes the axial deviation of the inner and outer rings 50 and 51 based on raceway curvatures and the radial internal clearance after mounting of rack grooves 53 and 54.

SUMMARY OF THE INVENTION

A main object of this invention is to provide a pulley unit capable of decreasing an axial deviation between a pulley and a shaft.

Other objects, features and advantages of the present invention will be apparent from the following description.

In summary, a pulley unit according to the invention comprises a pulley; a shaft which can be relatively rotated with the pulley and which is concentrically arranged inner side of the pulley; a one-way clutch which is interposed in an annular space between the pulley and the shaft; and a ball bearing which is disposed adjacent to the one-way clutch in an axial direction in the annular space.

As for the pulley unit of the invention, firstly, raceway curvatures of both inner and outer rings of the ball bearing are set to not less than 50.5% and not more than 52.0%. Secondly, a radial internal clearance after mounting of the ball bearing is set to less than 20 μm. Thirdly, both the first and second setting procedures are conducted to the ball bearing. Fourthly, the raceway curvatures of both the inner and outer rings of the ball bearing are set to not less than 50.5% and not more than 51.0%. Fifthly, at least one of the raceway curvatures of the inner and the outer ring of the ball bearing is set to not less than 50.5% and not more than 51.0%. Then, providing a curvature radius of the raceway groove of the outer ring is Ro and a diameter of the ball is D, the raceway curvature of the outer ring is expressed as the for a (Ro/D)×100%. Similarly, the raceway curvature of the inner ring is expressed as the formula (Ri/D)×100% with Ri for a curvature radius of the raceway groove thereof and D for a diameter of the ball.

In any of the setting, the axial internal clearance of the ball bearing becomes small, wherein the axial deviation between the pulley and the shaft is reduced. As a consequence, this contributes to restricting an inclination of the pulley unit caused by a belt load and ultimately can suppress a damage, a heat generation on the one-way clutch and the bearing, a shorter life of a lubricant, and a noise generation due to a belt vibration.

Preferably, the ball bearing is arranged in one side of the one-way clutch, and the roller bearing is arranged in another side of the one-way clutch. The radial internal clearance after mounting of the ball bearing is set to a smaller value than the same of the roller bearing. The setting can reduce a rattle in the radial and the axial directions of the ball bearing, whereby, the pulley and the shaft can be integrally structured in order to improve a rigidity against a moment load.

BRIEF DESCRIPTION OF THE DRAWINGS

These and other objects as well as advantages of the invention will become clear by the following description of preferred embodiments of the invention with reference to the accompanying drawings, wherein.

In all these figures, like components are indicated by the same numerals.

DETAILED DESCRIPTION OF PREFERRED EMBODIMENTS

A pulley unit according to a preferred embodiment of the invention with reference to FIGS. 1 to 5 will be described. A pulley unit includes a pulley 1, a rotor shaft 2, a one-way clutch 3, a dee groove ball bearing 4 and a needle roller bearing 5.

Figure 1:
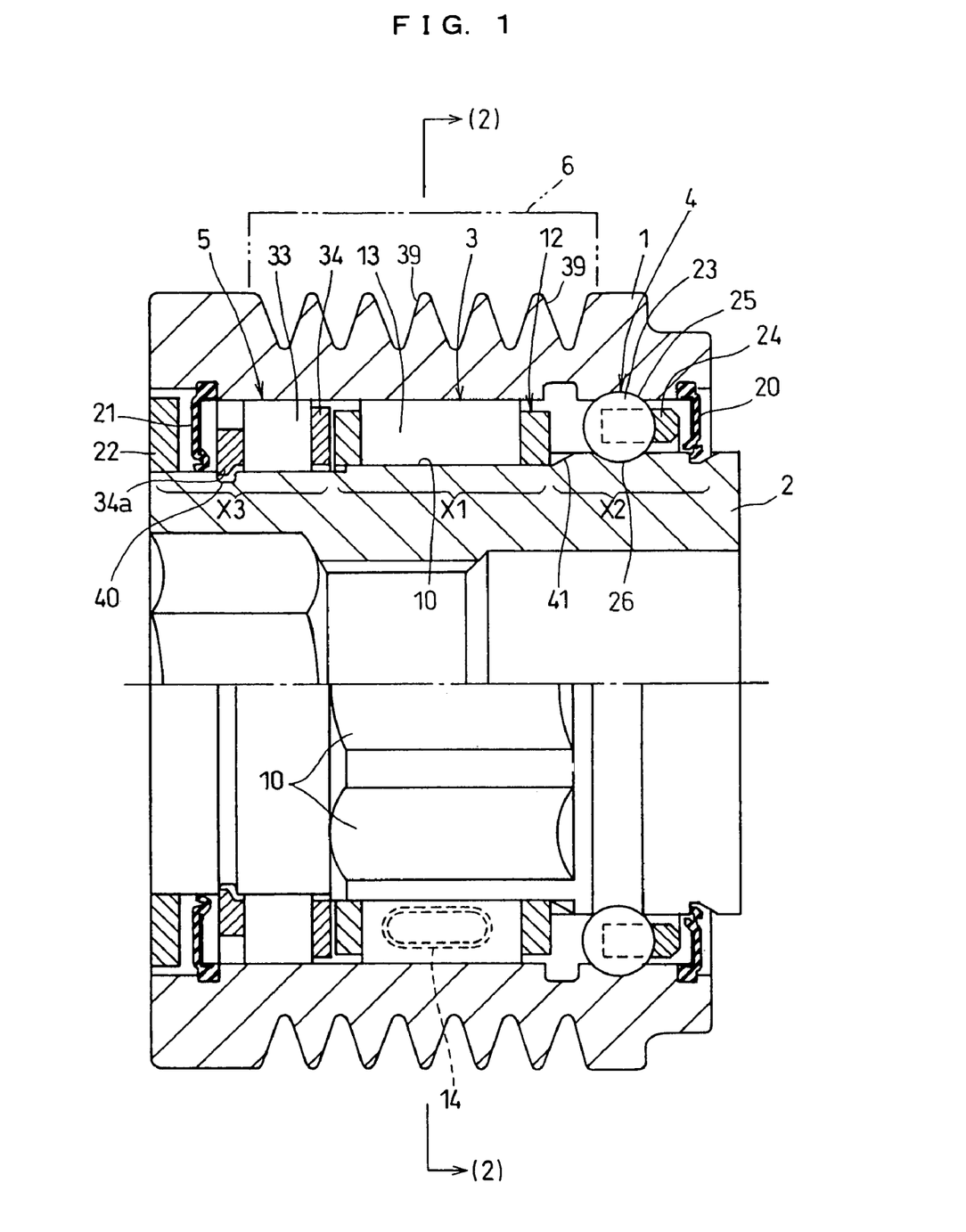
FIG. 1 is a sectional view of a pulley unit according to a preferred embodiment of the present invention.
Figure 2:
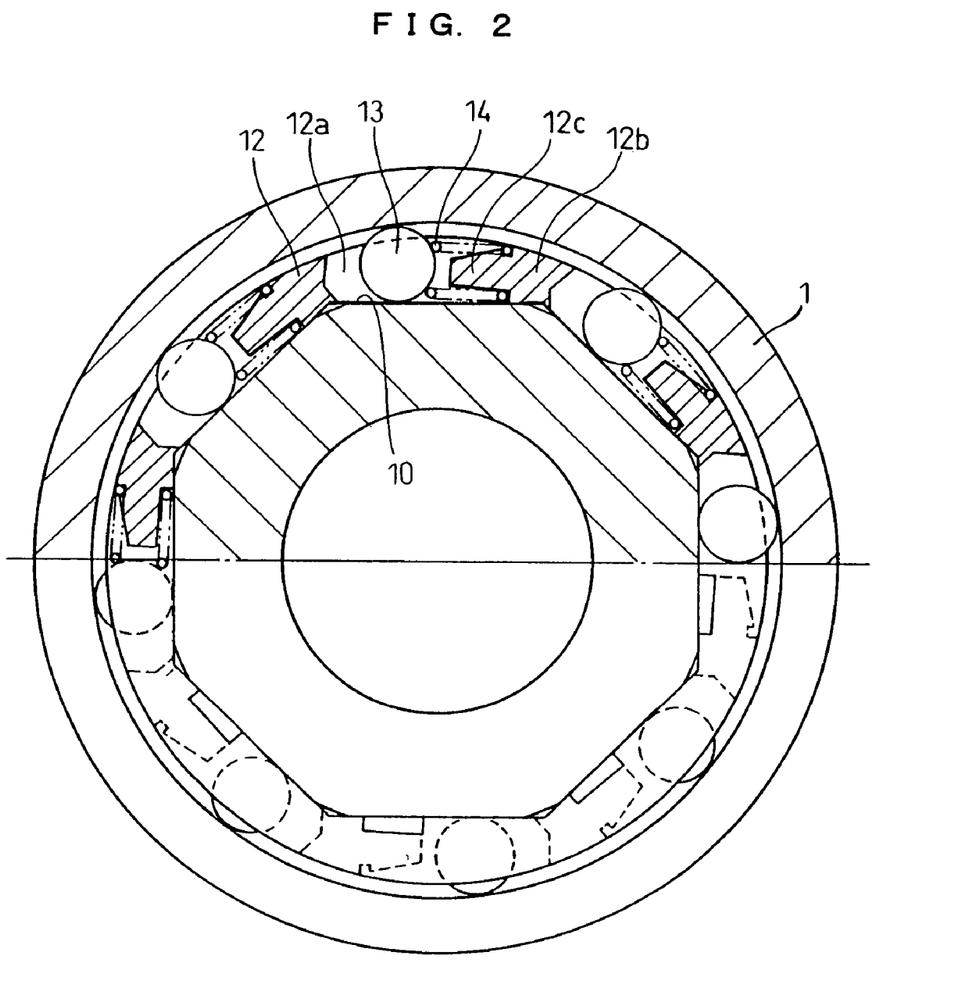
FIG. 2 is a sectional view of the pulley unit along a line (2)—(2) of FIG. 1.

The rotor shaft 2 is cantilevered as an example of a shaft. The rotor shaft 2 is relatively rotatable with the pulley 1 and concentrically arranged inner side thereof. The pulley 1 serves as an outer annular body, while the rotor shaft 2 serves as an inner annular body. An outer peripheral surface of the rotor shaft 2 includes three regions X1, X2, and X3. The region X1 is an intermediate region in the axial direction on which the one-way clutch 3 is mounted. The region X2 is one region in the axial direction on which the ball bearing 4 is mounted. The region X3 is the other region in the axial direction on which the roller bearing 5 is mounted.

Figure 3:
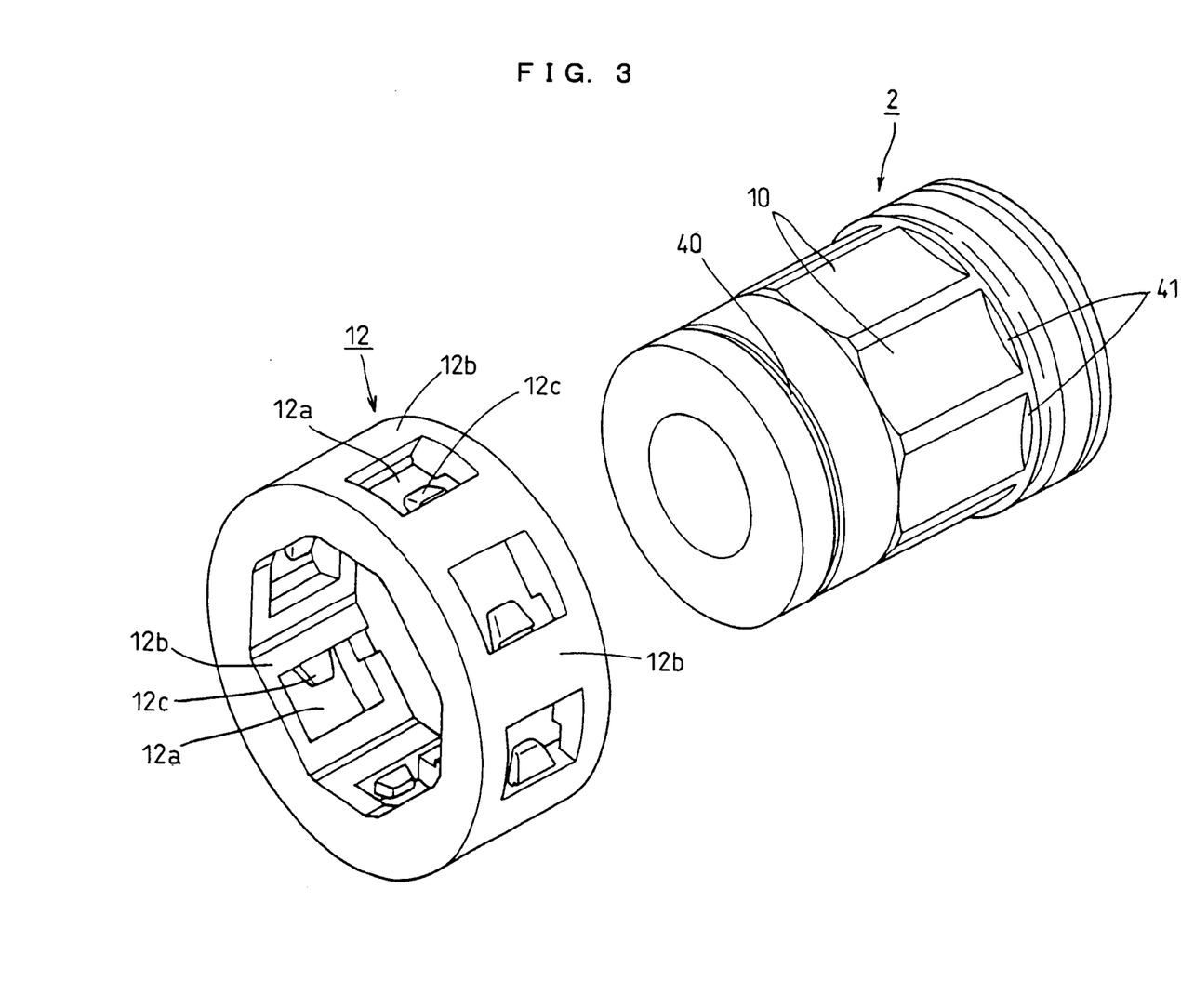
FIG. 3 is a oblique view of a rotor shaft and a cage of a one-way clutch shown in FIG. 1.

The one-way clutch 3 is interposed in the intermediate region X1 of an annular space between the pulley 1 and the rotor shaft 2. The one-way clutch 3 is e with a cage 12, a plurality of rollers 13 and a coil spring 14. An inner peripheral surface of the pulley 1 and the outer peripheral surface of the rotor shaft 2 serves as raceways on which the rollers 13 of the one-way clutch 3 roll. Thus the pulley 1 and the rotor shaft 2 are used as the inner and outer rings of the one-way clutch. The cage 12 has pockets 12a provided at several positions in the circumferential direction thereof. The pockets 12a penetrate inside and outside in the radial direction of the cage 12. The rollers 13 of the one-way clutch 3 are housed and held in the pockets 12a one each. In the cage 12, a pillar member 12b exists between the adjacent pockets 12a of the cage 12. A projection 12c is integrally formed in an inner wall face of the pillar member 12b. A coil spring 14 is mounted on the projection 12c of the cage 12. The coil spring 14 energizes the rollers 13 to a narrow side (lock side) of a wedge-like space formed between a cam face 10 of the rotor shaft 2 and the inner peripheral surface of the pulley 1.

Figure 4:
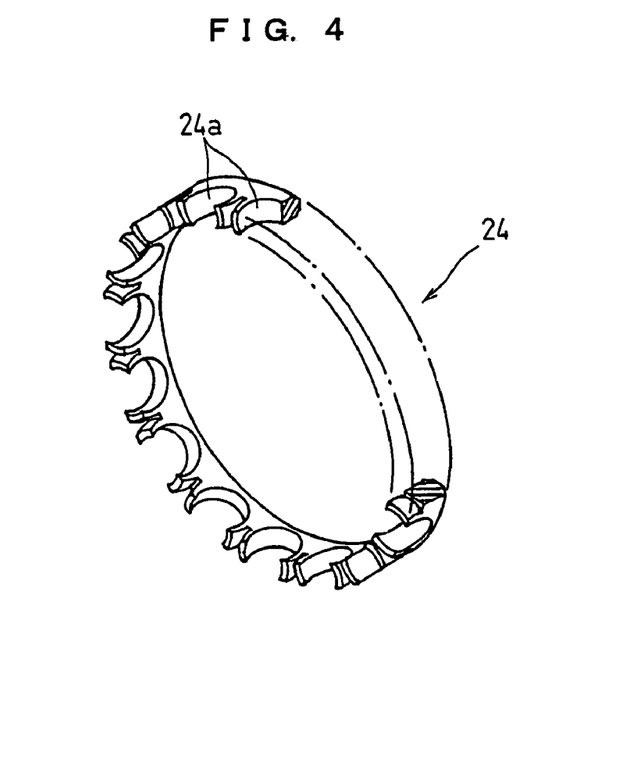
FIG. 4 is a oblique view of a cage of a deep groove ball bearing shown in FIG. 1.

The deep groove ball bearing 4, as one rolling bearing, is disposed in one side in the axial direction of and adjacent to the one-way clutch 3 (which corresponds to the region X2) in the annular space. The deep groove ball bearing 4 has a plurality of balls 23 and a cage 24. In the inner peripheral surface of the pulley 1 and the outer peripheral surface of the rotor shaft 2, deep raceway grooves 25 and 26 are forced, wherein the rollers 23 of the deep groove ball bearing 4 roll. According to the raceway grooves 25 and 26, the pulley 1 and the rotor shaft 2 are also used as the inner and outer rings of the deep groove ball bearing 4. The cage 24, as shown in FIG. 4, is forced into a crown shape, and has a plurality of pockets 24a for housing and holding the balls 23.

The needle roller bearing 5, as the other rolling bearing, is disposed in the other side in the axial direction of and adjacent to the one-way clutch 3 (which corresponds to the region x3) in a free end side of the pulley unit A. The deep groove ball bearing 4 is arranged in an auxiliary machine side, for example, an alternator side. The needle roller bearing 5 has a plurality of rollers 33 and a cage 34. The inner peripheral surface of the pulley 1 and the outer peripheral surface of the rotor shaft 2 form raceways on which the rollers 33 of the needle roller bearing 5 roll. Thus the pulley 1 and the rotor shaft 2 are also used as the inner and outer rings of the needle roller bearing 5.

As described, the ball bearing 4 is arranged in a basic end side of the rotor shaft 2, and the roller bearing 5 is located in a free end side of the rotor shaft 2.

The flat cam face 10 used for the one-way clutch 3 is formed at several positions in a circumference of the intermediate region X 1 of the rotor shaft 2. Inner ring raceways of the ball bearing 4 and the roller bearing 5 are secured in both side regions in the axial directions X 2 and X 3 of the rotor shaft 2. The region X 1 of the rotor shaft 2 has an octagonal shape composed of eight cam faces 10. The regions, X 2, X 3 of the rotor shaft 2 constitute a cylindrical shape.

In order for the one-way clutch 3, the ball bearing 4 and the roller bearing 5 to be easily incorporated in that order from one axial direction between the pulley 1 and the rotor shaft 2, an outside dimension of the region X 2, of the rotor shaft 2 is set to be larger than that of the region X 3 thereof.

In the region X3 of the rotor shaft 3, a locating groove 40 is provided. An diametrically-inward ring-shaped projection 34a is provided on an inner peripheral surface of the cage 34 of the roller bearing 5. The projection 34a is engaged in the locating groove 40. Thus the cage 34 is located in the axial direction. The inner peripheral surface of the cage 12 of the one-way clutch 3 is formed into an octagonal shape which coincides and fits to the outer shape of the region X1 of the rotor shaft 2. The cage 12 is fitted around the region X1 of the rotor shaft 2 with a state in which the cage 12 holds the rollers 13. Thereby the cage 12 is prevented from being rotated in the circumferential direction with respect to the rotor shaft 2.

A tapered step 41 is formed between the cam surface 10 of the region X1 and the region X2 of the rotor shaft 2. The cage 12 is prevented from moving toward the ball bearing 5 by the step 41. Thus the cage 12 is prevented from moving toward the roller bearing 5 by the cage 34 of the roller bearing 5 located axially with respect to the rotor shaft 2.

The outer peripheral surface of the pulley 1 has a belt guiding face 39. The belt 6 shown in two dotted lines is wound around the belt guiding face 39. The pulley 1 is rotationally driven by an engine crankshaft of an automobile. The rotor shaft 2 is fixed to the rotor of the alternator as an example of an input shaft of auxiliary machines. The one-way clutch 3 has a plurality of rollers 13 held in the cage 12. The cam face 10 is formed in the outer peripheral face of the rotor shaft 2 as many in number as the rollers 13. Thereby a space in the radial direction between the cam face 10 and the inner peripheral surface of the pulley 1 becomes narrower toward one side in the circumferential direction (a clock-wise direction in FIG. 2). The one side in the circumferential direction is a lock side. The space in the radial direction which becomes gradually narrower toward the lock side is stated a wedge-like space in this specification. The rollers 13 are disposed in the wedge-like space between the cam face 10 and the inner peripheral surface of the pulley 1, and are energized to the lock side by the coil spring 14. The one-way clutch 3, the deep groove ball bearing 4, and the needle roller bearing 5 are sealed by a pair of seal rings 20 and 21 and a seal annular body 22. The one-way clutch 3 and both the bearings 4 and 5 are lubricated by a common lubricant.

Figure 5:
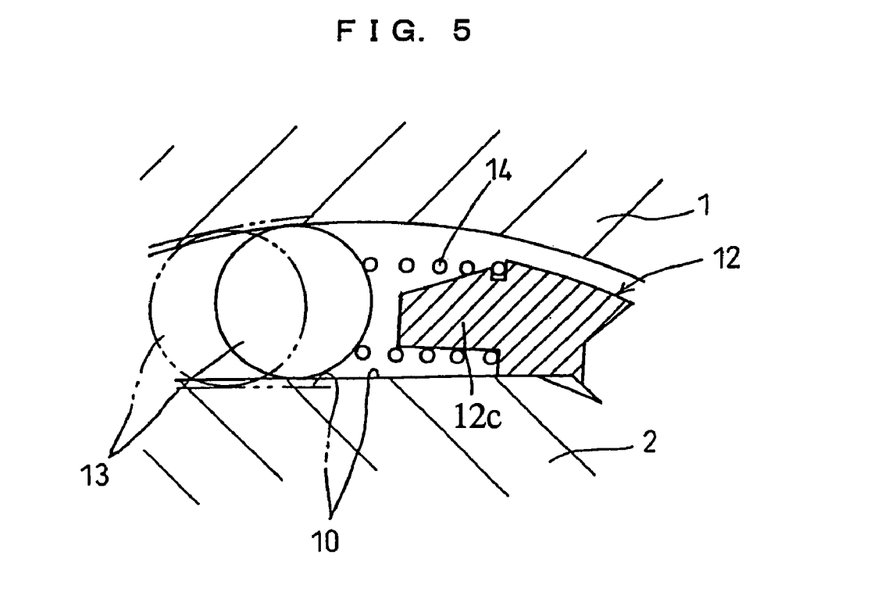
FIG. 5 is an explanatory drawing showing locked and free states of rollers of a one-way clutch

In operation, when a rotational speed of the pulley 1 becomes relatively faster then that of the rotor shaft 2, the rollers 13 of the one-way clutch 3 are rolled to the lock side of the wedge-like space as shown in a solid line in FIG. 5. When the rollers 13 are rolled to the lock side in such a manner, the rollers 13 are caught between the inner face of the pulley 1 and the outer face of the rotor shaft 2 and cannot be rolled. The state is referred to as a locked state. In the locked state, the pulley 1 and the rotor shaft 2 are rotationally integrated via the rollers 13. In the locked state, the rotor shaft 2 cannot be freely rotated and synchronously rotates with the pulley 1.

When the rotational speed of the pulley 1 becomes relatively slower than the same of the rotor shaft 2, the rollers 13 of the one-way clutch are rolled to a broad side of the wedge-like space, that is, an unlock side, as shown in an phantom line in FIG. 5.

The roll of the rollers 13 to the unlock side leads the rotor shaft 2 to a free state in which the rotor shaft 2 can be freely rotated with respect to the pulley. In the free state, transmission of a rotational power from the pulley 1 to the rotor shaft 2 is intercepted. As a result, the rotor shaft 2 continues its rotation by its own rotational inertial force.

The raceway curvature of the deep groove ball bearing 4, and a relation between the radial internal clearance after mounting and the axial internal clearance are explained in a few patterns. If the curvature radius of the raceway grooves 25 and 26 is R, and the dieter of the halls 23 is D, the raceway curvature is explained in the following formula as shown in the formula (1).

$$\text{The raceway curvature} = (R/D) \times 100$$

(1) In a case that the raceway curvatures of the raceway grooves 25 and 26 are set to a small value.

The raceway curvatures of the raceway grooves 25 and 26 are set respectively to not less than 50.5% and not more than 52.0%. The radial internal clearance after mounting is set to 0–30 μm. A relation between the radial internal clearance after mounting (dim) and the axial internal clearance (um) are shown in the following Table 1.

TABLE 1

| radial internal clearance after mounting [μm] | axial internal clearance [μm] |
|---|---|
| 0 | 0 |
| 5 | 30~62 |
| 10 | 42~87 |
| 15 | 51~106 |
| 20 | 58~122 |
| 25 | 64~136 |
| 30 | 69~149 |

According to Table 1, a range of an axial internal clearance in a range of a radial internal clearance after mounting 10 to 30 μm is 42–149 μm. The fact shows the range of the axial internal clearance becomes generally small, red to the range of the axial internal clearance, 140–239 μm in the range of the radial internal clearance after mounting, 21–52 μm shown in Table 7. When the radial internal clearance after mounting is less than 10 μm, the axial internal clearance becomes even smaller with 0–62 μm.

(2) In a case that a radial internal clearance after mounting is set to a small value.

The radial internal clearance after mounting of a deep groove ball bearing 4 is set to less than 20 μm. In the same manner as conventional examples, the raceway curvature of the raceway groove 26 is set to 52.0–52.5%, and the raceway curvature of the raceway groove 25 is set to 53.0–53.5%. A value of the axial internal clearance in this case is shown in Table 2.

TABLE 2

| radial internal clearance after mounting [μm] | axial internal clearance [μm] |
|---|---|
| 0 | 0 |
| 5 | 69~76 |
| 10 | 97~107 |
| 15 | 119~130 |
| 20 | 137~150 |

As apparent in Table 2, when a radial internal clearance after mounting is less than 20 μm, an axial internal clearance is 0–130 μm. When the radial internal clearance after mounting is less than 10am, the axial internal clearance becomes smaller with 0–62 μm compared to conventional examples. Table 3 is shown as an example of comparison. In Table 3, a radial internal clearance after mounting is 21–52 μm, and an axial internal clearance is 109–200 μm.

TABLE 3

| radial internal clearance after mounting [μm] | axial internal clearance [μm] |
|---|---|
| 21~52 | 109~200 |

In case of a deep groove ball bearing 4 related to a radial internal clearance after mounting and an axial internal clearance shown in Table 3, the axial internal clearance generates an axial deviation between the pulley 1 and the rotor shaft 2 by an axial vibration of the pulley unit due to, for example, an engine vibration. As a result, the rollers 13 of the one-way clutch 3 and the rollers of the needle roller bearing 5 slip in the axial direction with respect to the inner and outer rings thereof so as to possibly deteriorate interlocking thereof with the inner and outer rings thereof and generate a vibration therefrom due to a winding roll.

The above-mentioned slip in the axial direction generates an exfoliation, an abrasion and a heat in the rollers 13 of the one-way clutch 3, the rollers of the needle roller bearing 5 and the inner and outer rings thereof so as to possibly shorten a life of a lubricant.

(3) As a more preferable example, a value of the axial internal clearance is shown in Table 4 in a case that the raceway curvatures of the inner and the outer raceway grooves 25 and 26 of the deep groove ball bearing 4 are respectively, not less than 50.5%, and not more than 51.0%.

TABLE 4

| radial internal clearance after mounting [μm] | axial internal clearance [μm] |
|---|---|
| 0 | 0 |
| 5 | 30~43 |
| 10 | 42~61 |
| 15 | 51~74 |
| 20 | 58~85 |
| 25 | 64~95 |
| 30 | 69~103 |

As apparent from Table 4, an axial internal clearance becomes smaller compared to the examples shown in Table 7, with a value thereof 42–103 μm in a range of a radial internal clearance after mounting 10–30 μm. As a more preferable example, it is identified that the axial internal clearance becomes smaller with a value thereof 0–85 μm in a range of the radial internal clearance after mounting 0–20 μm.

In the pulley unit structured as such, raceway curvatures are set to not less than 50.5% and not more than 52.0%, a radial internal clearance after mounting is set to less than 20 μm, or in a combination thereof can make the axial internal clearance small. When the axial internal clearance becomes small, the axial deviation of the pulley 1 and the rotor shaft 2 can be reduce to the minimum. Consequently, the rollers 13 of the one-way clutch 3 and the rollers 33 of the needle roller baring 5 can be restricted in terms of a slip thereof in an axial direction of the inner and outer raceway grooves, worsening interlocking thereof with raceway rings and a vibration due to a winding roll. Restricting the slip in the axial direction can restrict an exfoliation and an abrasion of the rollers 13, 33 and the raceway rings, and a decrease of life of a lubricant due to a heat generation.

Furthermore, setting the raceway curvatures to a small value such as not less than 50.5% and not more than 52.0% can restrict an inclination caused by a bending of the pulley unit in a case that a load of a belt B works on a free end portion of the pulley unit. As a result, it can be restricted that edge portions of the rollers 13 of the one-way clutch 3 and the rollers 33 of the needle roller bearing 5 contact the raceway grooves so as to be broken and generate heat. In addition, restricting of the inclination of the pulley unit makes it hard for the belt 6 to run out so as to restrict a vibration and a noise.

In the embodiments, the radial internal clearance may be a negative internal clearance. The deep groove bearing 4 may be, instead, a ball bearing equipped with inner and outer rings separate from the pulley 1, the rotor shaft 2. The hall bearing may be arranged in another side of the one-way clutch 3, or a omitting the bearing arranged in another side of the one-way clutch acceptable as well.

A raceway curvature of at least one of the inner and the outer rings is preferably set to not less than 50.5% and not more than 51.5%. More preferably, the raceway curvatures of both the inner and the outer ring are set to not less than 50.5% and not more than 51.0%.

In this case, the relation between the radial internal clearance after mounting and the axial internal clearance in case of one of the inner and the outer rings is shown in Table 5 and Table 6.

TABLE 5

| radial internal clearance after mounting [µm] | axial internal clearance [µm] |
|---|---|
| 0 | 0 |
| 5 | 57~65 |
| 10 | 81~92 |
| 15 | 98~112 |
| 20 | 113~129 |
| 25 | 126~144 |
| 30 | 136~157 |

TABLE 6

| radial internal clearance after mounting [µm] | axial internal clearance [µm] |
|---|---|
| 0 | 0 |
| 5 | 48~57 |
| 10 | 68~81 |
| 15 | 83~98 |
| 20 | 95~113 |
| 25 | 105~126 |
| 30 | 115~138 |

In Table 5, raceway curvature of an inner ring is set to not less than 50.5% and not more than 51.0%, the same of an outer ring is set to not less than 53.0% and not more than 53.5%. In Table 6, the equivalent setting; not less than 52.0% and not more than 52.5% for the inner ring, not less than 50.5% and not more than 51.0% for the outer ring.

Figure 6:
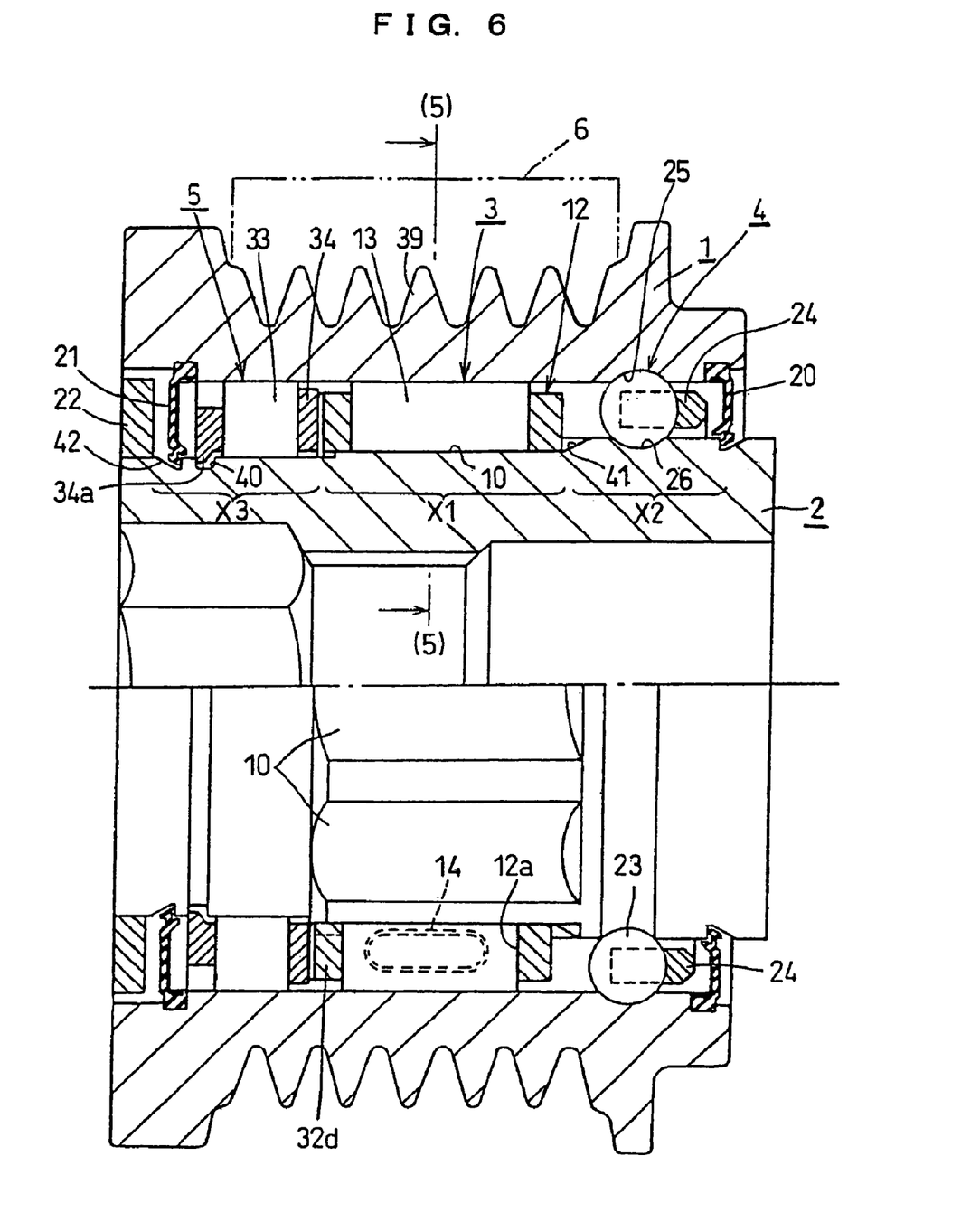
FIG. 6 is a sectional view of a pulley unit according to another preferred en of the invention.
Figure 7:
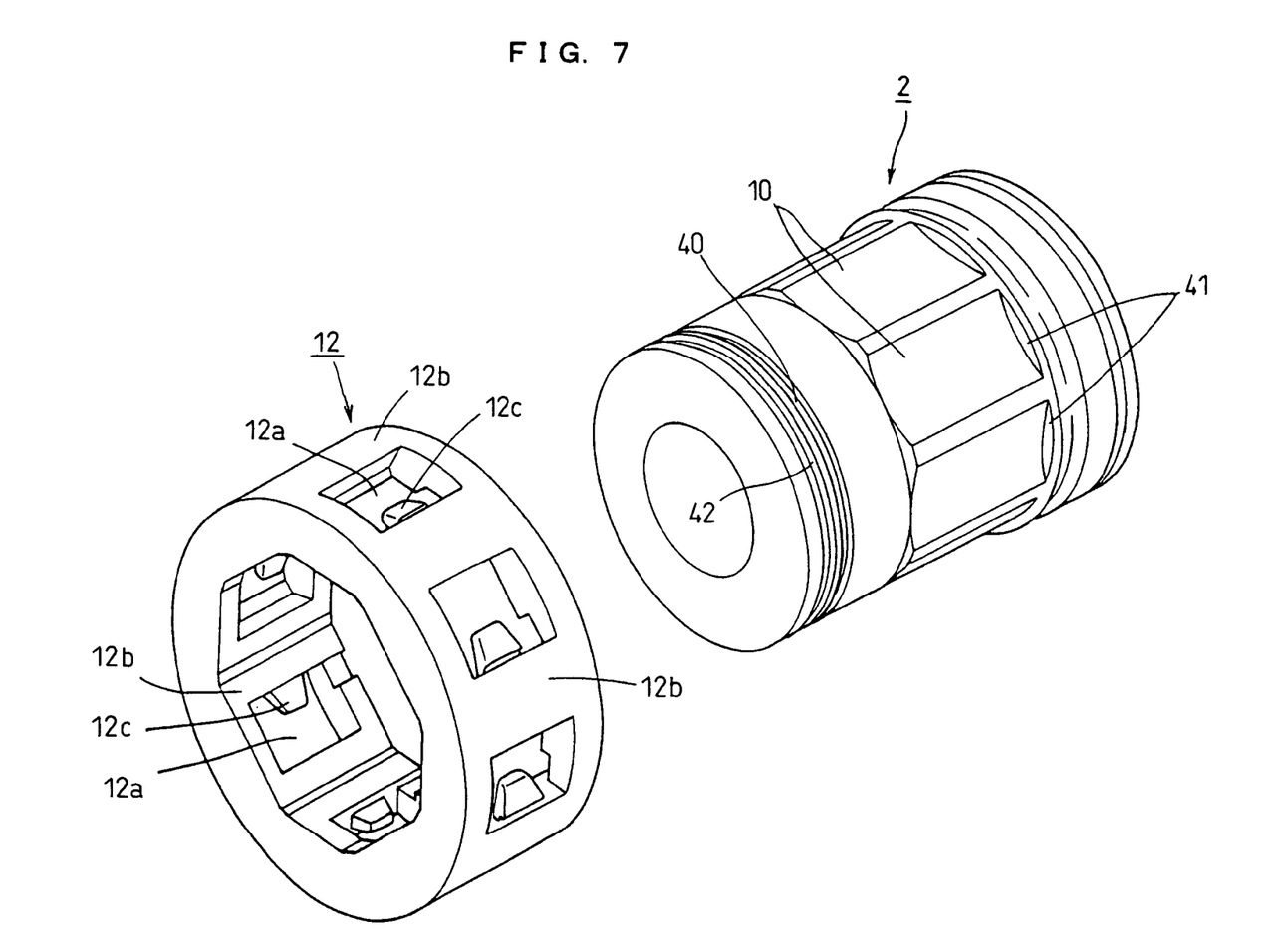
FIG. 7 is a oblique view showing a rotor shaft and a cage of a one-way clutch shown in FIG. 6.

In reference to FIGS. 6 and 7, a pulley unit according to another preferred embodiment of the present invention is described. A detailed explanation on the part corresponding to FIGS. 1 and 3 is omitted. In case of a pulley unit according to another preferred embodiment, an annular groove 42, to which a bottom end in a radial direction of the seal ring 21 is fitted, is formed on an outer radial face of the region x 3 in the rotor shaft 2. Since the other structure is similar to the above-described, a detailed explanation on the structure and the operation is omitted.

In case of the pulley unit, a radial internal clearance after mounting of the ball bearing 4 is set to such a relation as a value thereof is smaller than a radial internal clearance after mounting of the roller bearing 5.

On premise that the above-mentioned relation of values regarding the radial internal clearance after mounting of the ball bearing 4 and the roller bearing 5 is satisfied, the radial internal clearance after mounting of the ball bearing 4 is set to a range of −20–25 µm, preferably a range of −5–10 µm. The radial internal clearance after mounting of the roller bearing 5 is set to a range of 5–35 µm, preferably a range of 5–20 µm.

Figure 8:
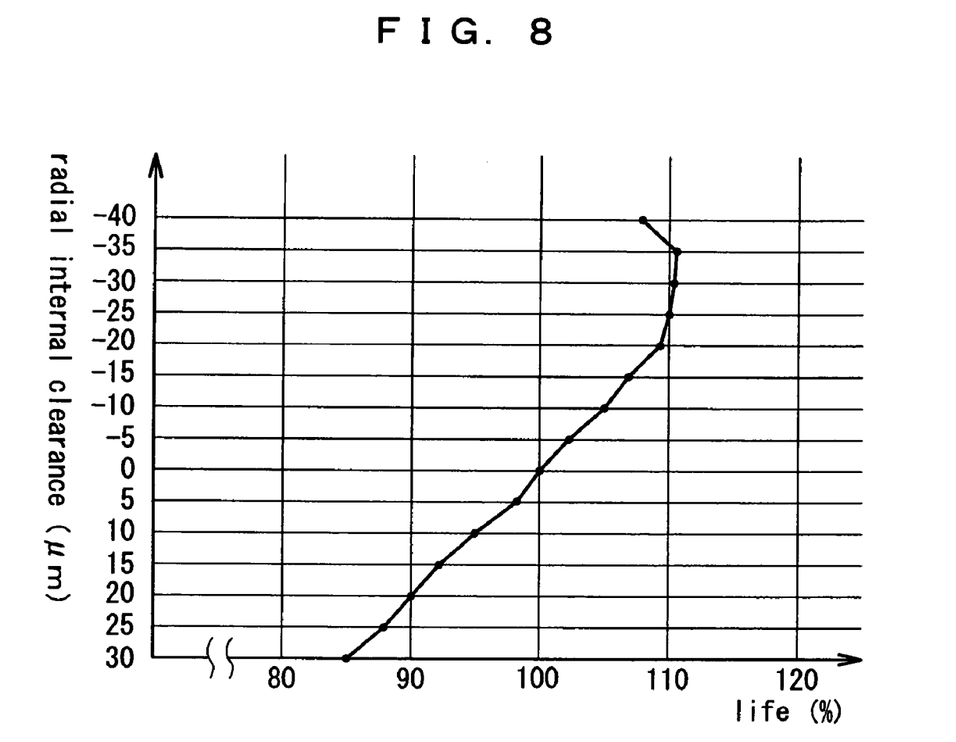
FIG. 8 is a graph showing a relation between a radial internal clearance after mounting of a ball bearing and a life thereof.

FIG. 8 shows a relation between a radial internal clearance after mounting and a life of the ball bearing 4. In FIG. 8, a horizontal axis denotes a life (%), and the vertical axis denotes a radial internal clearance after mounting (µm). This relation is based on the radial internal clearance 0 µm as the life 100%.

In case of the ball bearing 4, when the radial internal clearance is set to not more than −10 µm, a heat generation and a grease deterioration occurs, which leads to a drastic reduction of the life. Therefore, it is desirable to set to not less than −5 µm.

As described, when the radial internal clearance after mounting of the ball bearing 4 is set to a small value, a rattle in radial and axial directions thereof reduces to the minimum. In that manner, the pulley 1 and the rotor shaft 2 can be integrated at a high performance level and a rigidity against a moment load improves. Additionally, since the ball bearing 4 can reduce a freedom level of the rollers 13 of the one-way clutch 3, whereby the action of the rollers 13 can be stabilized, and a micro slip and a skew of the rollers 13 can be reduced. Therefore, a contribution can be made to stabilization of the action of the one-way clutch 3 and improvement of a durability of the one-way clutch 3 and the pulley unit.

The rotor shaft 2 is used as a respective inner ring of the one-way clutch 3, the ball bearing 4 and the roller bearing 5, and the pulley 1 is used as a respective outer ring of the one-way clutch 3, the ball bearing 4 and the roller bearing 5, wherein reduction of a number of parts can be effective in cost reduction. Since the ball bearing 4, the one-way clutch 3 and the roller bearing 5 are incorporated in that order, a condition, in which the radial internal clearance of the roller bearing 5 is larger, secures a favorable performance in the incorporating process.

When a wedge-like space is formed tough arranging a cam face 21 on an outer peripheral face of the rotor shaft 2 providing an inner peripheral face of the pulley 1 is of a circular shape in section, a rotational centrifugal force advantageously makes it hard for the rollers 13 to deviate to a large interval side in the wedge-like space in a free state. However, the cam face 10 may be arranged in the pulley 1 that is, on an outer ring element side.

Figure 9:
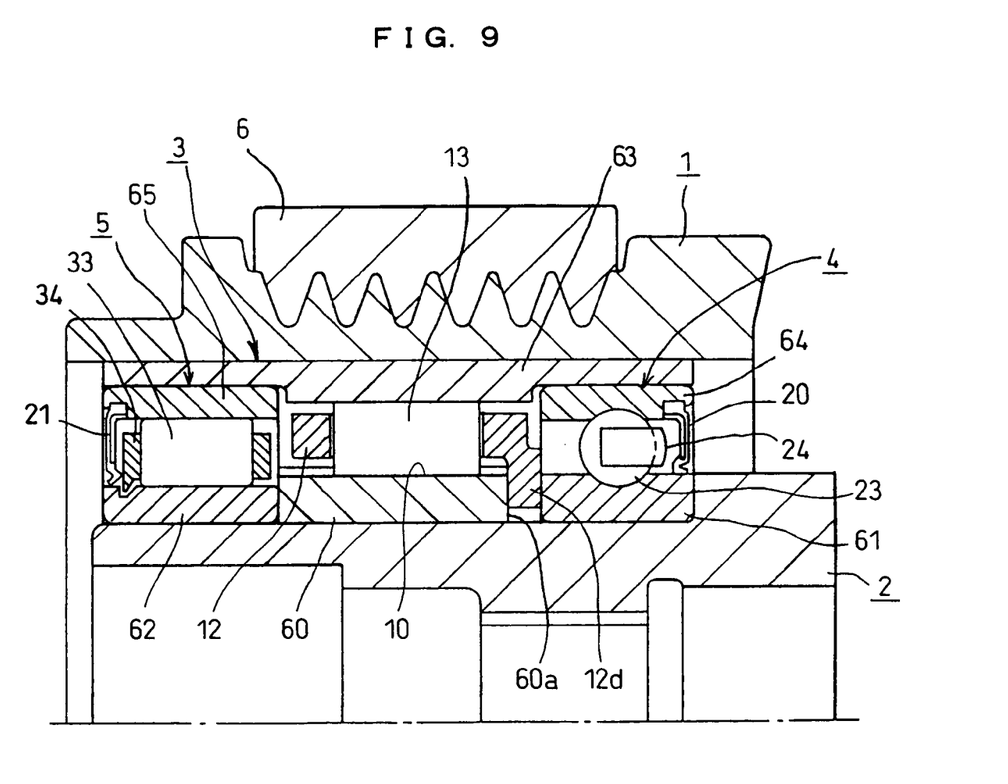
FIG. 9 is a sectional view of a pulley unit according to a still another preferred embodiment of the present invention.

Furthermore, like a pulley unit shown in FIG. 9, the present invention includes a structure in which the pulley 1 and the rotor shaft 2 are not used as both inner and outer rings respectively of the one-way clutch 3, the ball bearing 4 and the roller bearing 5. In this example, the inner rings 60, 61, 62 and the outer rings 63, 64, 65 are arranged respectively in the one-way clutch 3, the ball bearing 4 and the roller bearing 5. The outer ring 63 of the one-way clutch 3 is extended at length to both sides in the axial direction, and the outer rings 64 and 65 of the ball bearing 4 and the roller bearing 5 are fixed by force-fitting to the inner periphery of the extended portion. In such a structure, the relation between the respective rail internal clearance of the ball bearing 4 and the roller bearing 5 is similar to the described embodiment. In the structure, a radially-inward projection piece 12*d* is arranged at two places in a circumference of the cage 12 of the one-say clutch 3, and a notch 60*a* is arranged at two positions in a circumference of an end face of the inner ring 60. By engaging then, the cage 12 and the rollers 13 are located in the axial direction.

In this embodiment, a rattle in the radial and the axial directions of a ball bearing is reduced by setting the radial internal clearance after mounting of the ball bearing to a small value. Therefore, a pulley and a rotor shaft are integrated at a high performance level so as to improve a rigidity against a moment load. Additionally, the ball bearing can reduce a freedom level of a wedge member of the one-way clutch, thereby an acting performance of rolling bodies such as balls and rollers as the wedge member is stabilized, thereby a fine slip of the wedge member reduces. As a consequence of these, an action of the one-way clutch is stabilized, and a durability thereof and the pulley unit is improved.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A pulley unit comprising:
   a pulley having an inner circumferential surface defining a through hole;
   a shaft having an outer circumferential surface and disposed relatively rotatable with said pulley and said shaft being concentrically arranged inside said through hole of said pulley;
   a one-way clutch interposed in an annular space between said inner circumferential surface of said pulley and said outer circumferential surface of said shaft said one-way clutch having an inner ring and an outer ring respectively formed by said outer circumferential surface of said shaft and said inner circumferential surface of said pulley;
   a ball bearing arranged adjacent to said one-way clutch in art axial direction in said annular space, said ball bearing having an inner ring and an outer ring respectively formed by said outer circumferential surface of said shaft and said inner circumferential surface of said pulley; and a roller bearing arranged adjacent to said one-way clutch in said axial direction in said annular space, said roller bearing having an inner ring and an outer ring respectively formed by said outer circumferential surface of said shaft and said inner circumferential surface of said pulley;

wherein a radial internal clearance after mounting of said ball bearing is set to less than 20 μm and raceway curvatures of said inner and outer rings of said ball bearing are set to not less than 50.5% and less than 51.0%.

2. The pulley unit according to claim 1 wherein an axial clearance of said ball hearing is in the range of 0–85 μm.

* * * * *